United States Patent Office

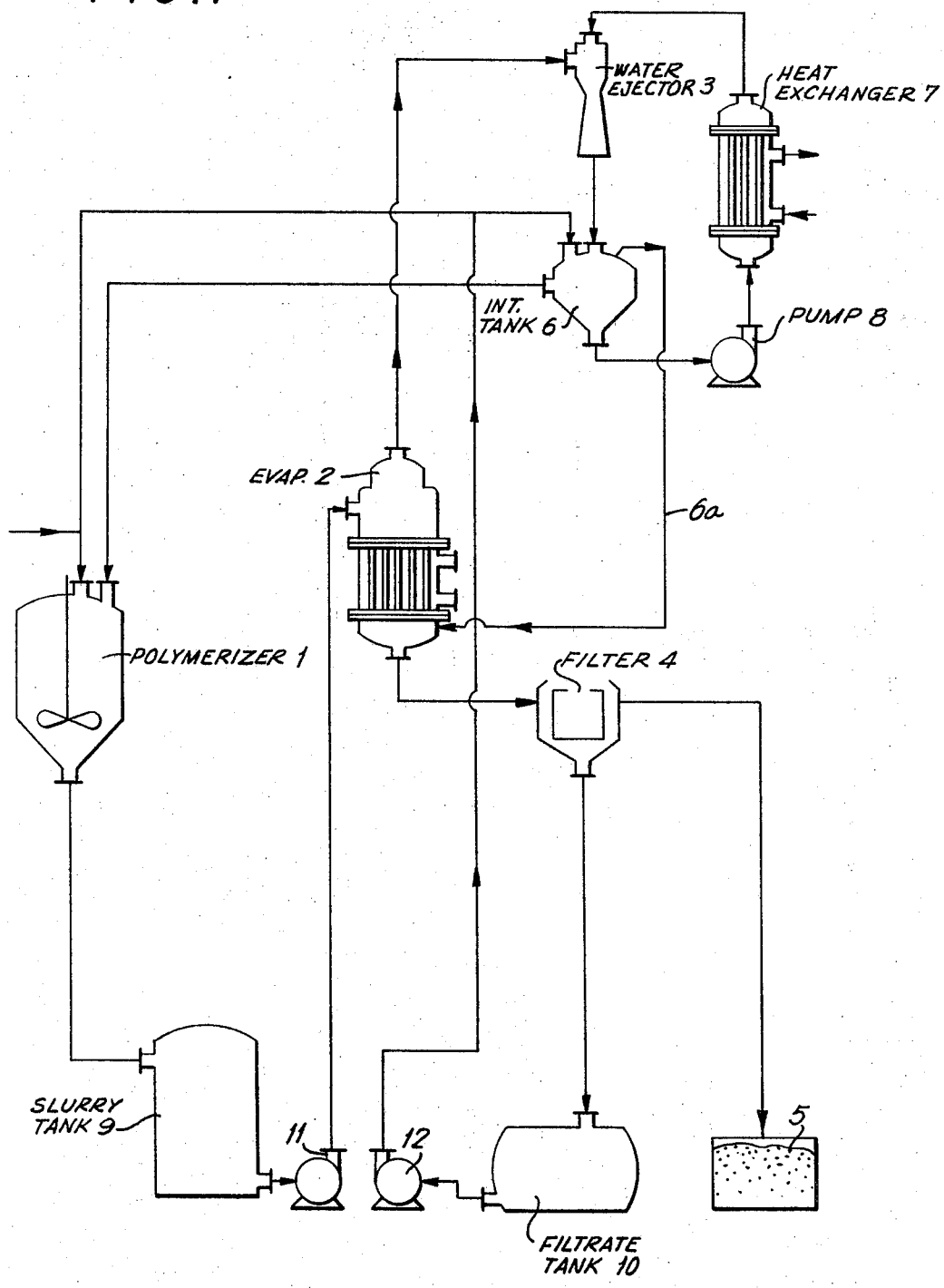

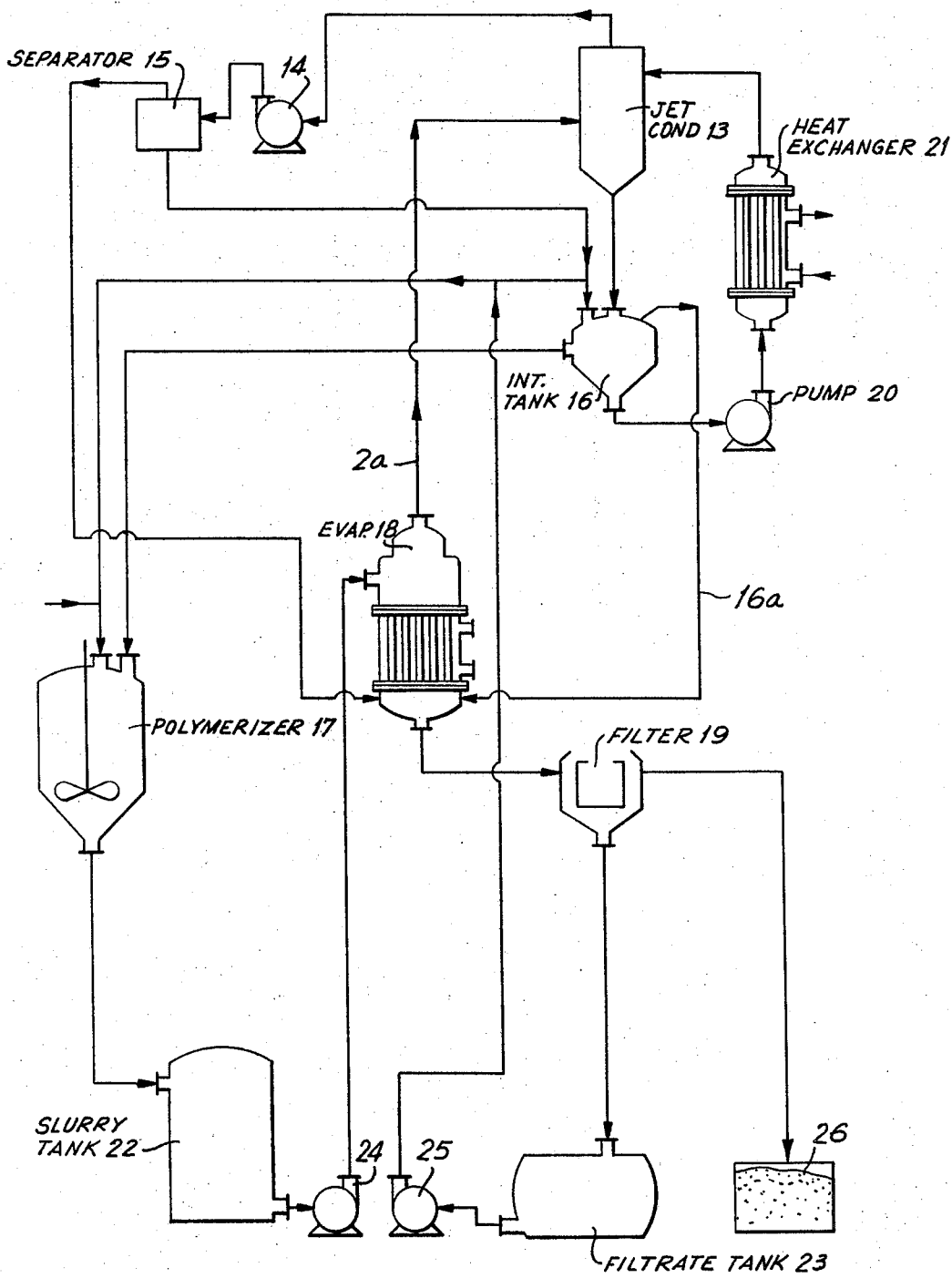

3,579,307
Patented May 18, 1971

3,579,307
APPARATUS FOR RECOVERING ACRYLONITRILE MONOMER IN THE PRODUCTION OF A POLYMER
Eiichi Wakita and Kunio Tokumitsu, Fuji-shi, Japan, assignors to Asahi Kasei Kogyo Kabushiki Kaisha, Osaka, Japan
Original application July 10, 1963, Ser. No. 294,101, Divided and this application Dec. 31, 1968, Ser. No. 788,188
Int. Cl. B01d 3/10; B01j 1/00; C07c 121/30
U.S. Cl. 23—263
8 Claims

ABSTRACT OF THE DISCLOSURE

An acrylonitrile polymerizer is connected to an evaporator to recover unpolymerized monomers. A water ejector or jet condenser is connected to the evaporator to recover gaseous monomers therefrom. A tank receives a stream from the ejector or condenser with monomer condensate therein while a filter connected to the evaporator produces a solid filtered material and a filtrate which is fed to the ejector or condenser to form the stream. The tank returns part of the stream and condensate to the polymerizer.

OTHER APPLICATIONS

This application is a divisional of co-pending application Ser. No. 294,101 filed July 10, 1963.
Drawing:
FIG. 1 is a diagrammatic illustration of a first embodiment of the invention with a water ejector.
FIG. 2 is a diagrammatic illustration of a second embodiment of the invention with a jet condenser.

DETAILED DESCRIPTION

The present invention relates to apparatus for recovering acrylonitrile monomer or other ethylenically unsaturated compounds present in a slurry cotaining polyacrylonitrile or a copolymer of acrylonitrile and one or more ethylenically unsaturated compounds.

An object of the present invention is to provide improved apparatus for producing acrylic polymers with high quality whiteness and a comparatively uniform distribution of molecular weight in good yield for use as fibers, tapes, ribbons, and so forth.

In the known industrial production, some acrylonitrile monomer remains in the polymer slurry when produced either in a batch polymerization system or in a continuous system. This is especially true when the polymer desired should have excellent whiteness and comparatively uniform distribution of molecular weight. In this case, the yield of the polymerization is usually low, and it is very important to recover the monomer which remains in the system.

According to the usual method of recovering acrylonitrile monomer and the comonomer which is an ethylenically unsaturated compound, the polymer slurry is filtered to separate the polymer, and the filtrate is subjected to distillation to recover acrylonitrile and the ethylenically unsaturated comonomer, which is then rectified for further use. In this method, however, it is difficult to recover the monomer and comonomer from a high concentration solution thereof due to the evaporation loss during the filtration of the polymer. Furthermore, the monomer concentration becomes very high in certain zones of the evaporator or the rectifier equipment as in the condensers, decanters, the pipe lines between the evaporators and the condensers, or inside the rectifier, where the monomer tends to polymerize, thus causing a blockage of the apparatus, thereby restricting the completion of the method. It is known that this phenomenon tends to occur when a compound such as sodium bisulfite is used as a polymerization catalyst which releases a volatile material on heating. The slurry and filtrate in the production of acrylic polymer tend to foam in the evaporator, causing difficulty in operating. When the slurry is subjected directly to the recovery of monomers by heating in an evaporator, the heat accelerates the coloration of the polymer. In addition, one of the important defects of the hitherto known methods of recovering monomers is that a non-volatile ethylenically unsaturated monomer cannot be recovered.

A feature of the present invention requires that the polymer slurry be directly introduced into a vacuum evaporator to evaporate the monomers, and a condenser such as a water ejector or a jet condenser in which the monomer vapor directly contacts the cooling medium and that all or part of the filtrate of the polymer slurry, from which the monomers were recovered, can be used as the liquid stream of the ejector or the cooling medium of the jet condenser to evacuate the evaporator. In this way, the monomer vapor is condensed and absorbed into the liquid stream, and the solution can then be re-used for further polymerization. It is possible to reduce the monomer concentration in the liquid stream by adding thereto together with the filtrate, a portion of water to be newly charged into the polymerizer. One can also add only the said water to the liquid stream and the filtrate is re-used with the excess of the liquid stream, but the monomer concentration in the liquid stream tends to increase in this method.

According to the method of the present invention, the temperature inside the evaporator can be controlled by adjusting the pressure, and coloration of the polymer can also be prevented. The vapor of acrylonitrile and ethylenically unsaturated comonomer present in the slurry are absorbed in the liquid stream of the ejector or the cooling medium of the jet condenser thus producing a very dilute cold solution of the monomer. Therefore, the apparatus is never blocked by the polymer even if sodium bisulfite is used as one of the polymerization catalysts and sulfur dioxide contaminates the monomer solution. Besides, sulfur dioxide, which is the efficient component for the catalytic action of sodium bisulfite, can be recovered if the pH of the slurry is adjusted to 4.0–1.5 before vacuum distillation. When the pH of the slurry is below 1.5, the whiteness of the polymer deteriorates and the thermal stability decreases in whiteness when the pH is above 4.0. All or part of the filtrate can be used as the liquid stream of the ejector or the cooling medium of the jet condenser and, when a part of the filtrate is used, the remainder of the filtrate is reusable for further polymerization. The filtrate contains such materials as non-volatile ethylenically unsaturated compound, unrecovered volatile monomer, active catalyst, and water and thus the over-all rate of monomer recovery becomes very high. Ion-exchanged water is preferably used as the polymerization medium and its recovery makes the process economically advantageous. The polymer is separated from the slurry after recovering the monomers by means of a dehydrator and the loss in this process is minute because of the very low monomer concentration. The relationship between the temperature of the slurry in the evaporator and the whiteness of the polymer depends upon the catalysts used, but temperatures below 65° C. are generally desirable. If catalysts are used which tend to readily color the polymer, such as ammonium persulfate and thioglycolic acid, temperatures below 50° C. are desirable. The pressure inside the evaporator which affords the desired temperature should be determined according to the amount of acrylonitrile and ethylenically unsaturated comonomer present in the slurry. The temperature of the liquid stream of the ejector or the cooling medium of the jet condenser is determined according to the design of the apparatus, the pressure inside the evaporator, and the amount of monomers to be recovered, but temperatures below 30° C. are desirable for preventing the polymerization of the recovered monomers. When the monomer concentration in the liquid stream of the ejector or in the cooling medium of the jet condenser is low or a volatile catalyst is not present in the polymer slurry, temperatures above 30° C. will not be harmful.

Occasionally, air is blown into the evaporator and is recycled after separation from the liquid stream of the ejector. In the case of using a jet condenser, the air sucked in and exhaled by an auxiliary pump is recycled. In this way, foaming of the slurry in the evaporator is completely prevented and the evaporation loss of the monomer is negligible because the air is recycled. In the case of using sodium bisulfite as a catalyst, consumption by oxidation is almost negligible except during the start-up period of the process because oxygen in the air is replaced by nitrogen during the recycle of the air. The amount of air to be blown into the apparatus may be determined by observation, but usually 0.1–10% of the vapor to be evaporated is desirable. One problem in the method stated above is the partial condensation of monomer in the pipe lines between the evaporator and the ejector or the jet condenser. If monomer condenses in the pipe line, the concentration is usually high and polymerization may occur resulting in blockage of the pipe line. This difficulty can be eliminated by warming the pipe line above the temperature of condensation by means of steam or electric heating.

More specifically, the present invention is explained by the following example in conjunction with FIG. 1. Polymer slurry in polymerizer 1 is vacuum-distilled in an evaporator 2 with the help of a water ejector 3. Acrylonitrile monomer in the slurry is evaporated and is absorbed in the stream of the water ejector. Then the polymer is separated by filter 4. All or part of the filtrate is sent to intermediate tank 6 and is added to the stream of water ejector 3. Any surplus of the liquid in intermediate tank 6 is sent to the polymerizer and is reused.

The stream of the water ejector 3 is transferred by pump 8 to heat exchanger 7 where it is cooled down to a specific temperature. If necessary, slurry tank 9, filtrate tank 10, slurry pump 11, filtrate pump 12, and polymer tank 5 may be used. When air is blown into evaporator 2, pipe line 6a is used to recycle therethrough the air separated in the upper part of intermediate tank 6 to evaporator 2.

As shown in FIG. 2, a jet condenser 13 is used in place of ejector 3 in FIG. 1 and non-condensable gas is sucked through the upper part of the jet condenser by a pump 14. A portion of the water which is to be fed into the polymerizer is used as the sealing water in the pump. The water from the pump is sent to intermediate tank 16 through gas-liquid separator 15 and is used as the cooling medium of the jet condenser as the gaseous monomer which does not condense in the jet condenser is absorbed. The water which is to be fed to the pump may be a part of the filtrate from the polymer slurry or a mixture thereof with fresh water. The polymer is separated by filter 19 after the slurry in polymerizer 17 is subjected to vacuum-distillation in evaporator 18 and the evaporated monomer is condensed and absorbed in the cooling medium of the jet condenser. All or part of the filtrate is sent to intermediate tank 16 and is used as the cooling medium of the jet condenser. The surplus of the cooling medium is sent to polymerizer 17 from the intermediate tank and is reused for further polymerization. The cooling medium of the jet condenser is recycled by pump 20 and its temperature is maintained constant by heat exchanger 21. As explained above, slurry tank 22, filtrate tank 23, slurry pump 24, filtrate pump 25, and polymer storage tank 26 may be used when needed. A water ejector is more convenient than a jet condenser because it is in effect a combination of a pump and condenser together, and thus a barometric leg is not required.

The present invention is applicable to the recovery of acrylonitrile and one or more ethylenically unsaturated compounds copolymerizable therewith. The ethylenically unsaturated compounds include: styrene, α-methyl styrene and ring-substituted derivatives thereof (p-methyl styrene, o-ethyl styrene, p-chloro-styrene, p-nitro styrene, p-methyl α-methyl styrene, etc.), acrylic acid, methacrylic acid, and alkyl, aryl and aralkyl esters thereof (methyl acrylate, ethyl acrylate, propyl acrylate, butyl acrylate, methyl methacrylate, ethyl methacrylate, propyl methacrylate, butyl methacrylate, etc., phenyl acrylate, α-naphthyl acrylate, phenyl methacrylate, β-naphthyl methacrylate, benzyl acrylate, etc.), acrylamide, methacrylamide, and N-substituted derivatives thereof (N-methyl acrylamide, N-ethyl acrylamide, N-butyl acrylamide, N-methyl methacrylamide, N-ethyl methacrylamide, N-propyl methacrylamide, N,N-dimethyl acrylamide, N,N-diethyl acrylamide, N,N-diethyl methacrylamide, N,N-methyl ethyl methacrylamide, etc.), methacrylonitrile, ethacrylonitrile, and homologues thereof, unsaturated ketones such as methyl vinyl ketone, vinyl compounds such as vinyl chloride, vinyl acetate, chlorovinyl acetate, vinyl propionate, vinyl butyrate, vinyl stearate, etc., vinylidene chloride, vinylidene cyanide, acrolein, itaconic acid, maleic acid, fumaric acid; monoalkyl esters, dialkyl esters, monoaryl esters, diaryl esters, monoaralkyl esters, diaralkyl esters, monoamides, diamides, mono-N-alkyl amide, di-N-alkyl amide, and monoamide monoesters of itaconic, maleic, and fumaric acids (methyl itaconate, dimethyl itaconate, diethyl maleate, dipropyl fumarate, itacoamide, di-N-methyl itacoamide, etc.), vinyl ethyl ether, allyl alcohol, methallyl alcohol; vinyl compounds containing sulfonic acid groups, (vinyl sulfonic acid, methallyl sulfonic acid, p-styrene sulfonic acid, etc.), α-sulfoacrylonitrile, sulfoalkyl acrylate, sulfoalkyl methacrylate, sulfoaryl acrylate, sulfoaryl methacrylate; and vinyl compounds containing a basic nitrogen atom, (2-methyl-5-vinyl pyridine, 4-vinyl pyridine, N,N-diethyl aminoethyl methacrlate, vinylimidazol, etc.).

The remarkable efficiency of recovery in the present invention is explained in greater detail in the following examples, where all the percentages and amounts are based on weight and the $\eta_{sp./c.}$ was measured in dimethylformamide at 35° C. and with a polymer concentration of 0.2 g./100 cc. The $\eta_{sp.}$ refers to specific viscosity, and c. to the polymer concentration in g./100 cc.

Example 1

To 170 parts of water, the pH of which had been adjusted to 3.0 with sulfuric acid, there were added 30 parts of acrylonitrile, 7.5% of ammonium persulfate, and 0.35% of thioglycolic acid respectively based on the weight of acrylonitrile. The mixture was warmed at 45° C. for 4 hours for polymerization. The polymer obtained was 21 parts or 70% of the theoretical amount. The polymer had sufficient whiteness and a $\eta_{sp./c.}$ of 1.45. Shaping ability was considered to be acceptable.

The polymer slurry obtained above was sent to tank 9 in FIG. 1, which is then continuously fed to the evaporator 2 to recover acrylonitrile. Conditions were controlled so that the pressure in the evaporator was 50 mm.-Hg (absolute), out-let temperature of the polymer slurry about 35° C. and the temperature of the liquid stream of the water ejector was 15° C. The polymer slurry from the evaporator was dehydrated until the water content thereof was about 180% based on the polymer and the entire filtrate was transferred to intermediate tank 6. In the liquid stream of the water ejector there were found 7.7 parts of acrylonitrile, 126 parts of water, and an amount of ammonium persulfate corresponding to 65% of the starting amount. This mixture was then used in polymerization without any difficulties and the polymer obtained was comparable to that obtained in polymerization where recovered material was not used. Non-condensable gas separated in the upper part of the intermediate tank was blown into the evaporator in a ratio of about 1% of the amount of evaporation. There was no foaming in the evaporator nor was there any blocking of the apparatus. The over-all yield of the polymer was 91.4%, and 65% of ammonium persulfate and 74% of water were retained for reprocessing. The acrylonitrile recovery ratio was 85.5%.

Example 2

To 80 parts of water, the pH of which had been adjusted to 2.0, there were added 20 parts of acrylonitrile, 0.9 part of sulfopropyl acrylate, 0.06 part of $\alpha,\alpha'$-azobisisobutyronitrile, and 0.08 part of thioglycolic acid. The mixture was warmed at 55° C. for 10 hours for polymerization and the polymer obtained from the slurry weighed 18.5 parts, which is 88.5% of the theoretical amount. The whiteness and shaping ability of the polymer were acceptable.

The polymer slurry obtained above was continuously fed to evaporator 18 shown in FIG. 2 to recover acrylonitrile. The pressure in the evaporator was maintained at 150 mm.-Hg (absolute), the slurry temperature at the exit of the evaporator was about 58° C., and the temperature of the liquid stream of the jet condenser was 30–35° C. The slurry was dehydrated until the water content thereof was about 167% based on the polymer after evaporation, and the entire filtrate was transferred to intermediate tank 16. In the liquid stream of the jet condenser were found 2.17 parts of acrylonitrile, 0.036 part of sulfopropyl acrylate, and 49.15 parts of water. This filtrate was then used in polymerization and the polymer obtained was comparable to that obtained in the polymerization where no recycled water was employed. A portion of fresh water added to the polymerization was fed to pump 14 for sealing, and the drain was fed to intermediate tank 16. The over-all yield of the polymer was 99.0%, and about 60% of water and sulfopropyl acrylate were recovered. The recovery ratio of acrylonitrile was 92.5%. The rate of air blown into the evaporator was about 0.5% of the amount of evaporation. Neither foaming in the evaporator nor blocking of the apparatus was observed.

Example 3

|  | Parts |
|---|---|
| Water | 900 |
| Acrylonitrile | 95 |
| Methyl acrylate | 5 |
| Sodium bisulfite | 3 |
| Potassium hydroxylamine disulfonate | 0.8 |
| Sulfuric acid | 0.2 |

The above compounds were continuously fed in the stated proportion into the polymerizer maintained at 55° C. so that the retention time was 4 hours. The polymer slurry (1004 parts) discharged from the polymerizer was filtered, washed with water, and dried. A white polymer was obtained which weighed 82 parts or 82% of the theoretical amount. The $\eta_{sp./c.}$ of the polymer was 2.00 and the pH of the slurry was 2.5.

The slurry obtained above (1004 parts) was continuously fed to evaporator 2 to recover acrylonitrile and methyl acrylate as is shown in FIG. 1. The pressure in the evaporator was maintained at 50 mm.-Hg (absolute), the slurry temperature at the exit of the evaporator was about 36–37° C., and the temperature of the liquid stream of the water ejector was about 20° C. The ratio of air blown into the evaporator was about 1.5% of the amount of evaporation. The pipe line between the evaporator and the water ejector was heated with steam to prevent partial condensation. The results of analysis of the aqueous solution in the intermediate tank 6 per 1004 parts of slurry were as follows:

|  | Parts |
|---|---|
| Water | 736 |
| Acrylonitrile | 16.8 |
| Methyl acrylate | 0.9 |
| Potassium hydroxylamine disulfonate | 0.16 |
| Sodium bisulfite | 0.5 |
| Sulfuric acid | 0.16 |

The above aqueous solution was continuously recycled to the polymerizer from intermediate tank 6 and a polymer slurry containing a polymer of the same $\eta_{sp./c.}$ and whiteness was obtained in the following polymerization. Therefore, the amounts of the compounds newly added to the polymerizer to obtain 1004 parts of polymer slurry were as follows:

|  | Parts |
|---|---|
| Water | 164 |
| Acrylonitrile | 78.2 |
| Methyl acrylate | 4.1 |
| Sodium bisulfite | 2.5 |
| Potassium hydroxylamine disulfonate | 0.64 |
| Sulfuric acid | 0.04 |

The over-all yield of polymer was 99.6%, the recovery ratio of acrylonitrile and methyl acrylate was 98.3%, and the recovery ratio of hydroxylamine sulfonic acid, sodium bisulfite, sulfuric acid, and water were about 20%, 17%, 80%, and 82%, respectively. Neither foaming in the evaporator nor blocking of the apparatus was observed.

Example 4

The conditions of polymerization and recovery were set up as follows in the same way as in Example 3.

Polymerization temperature: 62° C.
Retention time: 6.7 hr.
Pressure in the evaporator: 70 mm.-Hg (abs.)
Slurry temperature at the exit of evaporator: 45–43° C.
Temperature of the stream of water ejector: 20° C.
The amount of air blown into the evaporator: 1.3% of the amount of evaporation.

As result, the amount of initial charge (A) and additional charge (B) to the polymerizer and the amount of recovery (C) were as follows:

|  | A | B | C |
|---|---|---|---|
|  | (All in parts) | | |
| Water | 900 | 244 | 656 |
| Acrylonitrile | 91.5 | 82.7 | 8.8 |
| Methyl methacrylate | 8.0 | 7.2 | 0.8 |
| Sodium methallyl sulfonate | 0.5 | 0.45 | 0.05 |
| Sodium bisulfite | 2.3 | 1.6 | 0.7 |
| Potassium hydroxylamine disulfonate | 0.9 | 0.7 | 0.2 |
| Sulfuric acid | 0.2 | 0.04 | 0.16 |

The amount of polymer for A was 90 parts or 90% yield. The pH of the slurry was 2.5 and the $\eta_{sp./c.}$ of the polymer was 1.45.

The over-all yield of polymerization was 99.6% and the recovery ratios of acrylonitrile, methyl methacrylate, sodium methallyl sulfonate, potassium hydroxylamine disulfonate, sodium bisulfite, sulfuric acid, and water were 96.5%, about 10%, 20%, 30%, 80%, and 73%, respectively. Neither foaming in the evaporator nor blockage of the apparatus was observed.

We claim:
1. Apparatus for recovering acrylonitrile monomer and comonomer in a copolymerization process, said apparatus comprising a polymerizer for the polymerization of acrylonitrile and ethylenically unsaturated compounds in an aqueous medium; a vacuum evaporator operatively connected to the polymerizer for recovering unpolymerized monomers from the reaction mixture for distilling the same into gaseous monomer consisting of acrylonitrile and ethylenically unsaturated compounds, and a polymer slurry; means operatively connected to said evaporator for recovering gaseous monomer therefrom, said means producing a liquid stream at a sufficiently low temperature to condense the gaseous monomer for absorbing said monomer into said stream as a condensate; an intermediate tank operatively connected to said monomer recovery means for receiving the stream with said condensate of the monomer; a filter operatively connected to the evaporator for receiving the polymer slurry to produce solid filtered material and a filtrate, said filter being operatively connected to said means to form said stream whereby said filtrate is fed to said means to form said stream, said intermediate tank being operatively connected to the polymerizer for returning a part of the mixture of the stream and condensate to said polymerizer for subsequent polymerization, and recirculating means operatively connected to both said intermediate tank and the first said means for circulating said stream.

2. Apparatus as claimed in claim 1 wherein the first said means is a water ejector.

3. Apparatus as claimed in claim 1 wherein said recirculation means includes a pump and heat exchange in series.

4. Apparatus as claimed in claim 1 further comprising a slurry tank operatively connected to both the polymerizer and evaporator.

5. Apparatus as claimed in claim 1 further comprising a filtrate tank operatively connected to each of the filter and the polymerizer and intermediate tank.

6. Apparatus as claimed in claim 1 further comprising a polymer tank operatively to said filter.

7. Apparatus as claimed in claim 1 wherein said intermediate tank is operatively connected to said evaporator.

8. Apparatus as claimed in claim 1, wherein the first said means is a jet condenser; comprising a pump connected to said jet condenser to absorb unreacted monomer evaporated in the evaporator by the jet condenser for recirculation of the unabsorbed portion of the unreacted monomer to the evaporator.

References Cited

UNITED STATES PATENTS

| | | | |
|---|---|---|---|
| 2,545,144 | 3/1951 | Green et al. | 23—285X |
| 2,709,642 | 5/1955 | Mann et al. | 23—285 |
| 2,838,380 | 6/1958 | Kean | 23—285 |
| 2,880,076 | 3/1959 | Kircher et al. | 23—285X |
| 2,956,995 | 10/1960 | Knight | 260—94.9 |
| 2,957,861 | 10/1960 | Goins | 23—263X |
| 3,002,958 | 10/1961 | Wilkinson | 260—85.5 |
| 3,008,938 | 11/1961 | Irvin | 260—94.2X |
| 3,210,163 | 10/1965 | Mommaerts | 23—285 |
| 3,458,602 | 7/1969 | Pollock | 23—285X |

FOREIGN PATENTS

| | | | |
|---|---|---|---|
| 852,289 | 10/1960 | Great Britain | 23—285 |

MORRIS O. WOLK, Primary Examiner

B. S. RICHMAN, Assistant Examiner

U.S. Cl. X.R.

23—285; 260—465.9

UNITED STATES PATENT OFFICE
CERTIFICATE OF CORRECTION

Patent No. 3,579,307            Dated May 18, 1971

Inventor(s) Eiichi Wakita et al.

It is certified that error appears in the above-identified patent and that said Letters Patent are hereby corrected as shown below:

In the heading to the printed specification, after line 11, insert -- Claim priority, application Japan, July 11, 1962, 28518/62 --.

Signed and sealed this 16th day of May 1972.

(SEAL)
Attest:

EDWARD M. FLETCHER, JR.             ROBERT GOTTSCHALK
Attesting Officer                   Commissioner of Patents